Patented June 28, 1949

2,474,590

UNITED STATES PATENT OFFICE 2,474,590

PROCESS FOR PREPARING 1,2,3,4,5,6-HEXACHLOROCYCLOHEXANE

Glen H. Morey, Terre Haute, Ind., assignor to Commercial Solvents Corporation, Terre Haute, Ind., a corporation of Maryland No Drawing. Application November 16, 1945,
Serial No. 629,197

4 Claims. (Cl. 260—648)

My invention relates to the production of 1,2,3,4,5,6-hexachlorocyclohexane by the chlorination of benzene. More particularly, it relates to an improved process for the manufacture of 1,2,3,4,5,6-hexachlorocyclohexane of a high degree of insecticidal activity by chlorinating benzene in an aqueous alkaline medium in the absence of actinic light and catalysts.

The number of possible chlorine substitution products which may be obtained by the chlorination of benzene, as well as the number of isomers of the desired 1,2,3,4,5,6-hexachlorocyclohexane, complicate the problem of producing a product of desired properties. At the present time at least four of such isomers, each containing different physical properties, are known. It has recently been discovered that the gamma isomer of 1,2,3,4,5,6-hexachlorocyclohexane possesses extremely interesting insecticidal properties whereas the alpha, beta and delta isomers possess little or none. Obviously, therefore, for insecticidal use it is highly desirable to produce either solely the gamma isomer of 1,2,3,4,5,6-hexachlorocyclohexane or a mixture of the various isomers containing a sufficiently high proportion of the gamma isomer so that a difficult and expensive isomer separation operation will not be necessary. Furthermore, even if the isomer separation is not necessary, it is desirable that the mixture contain as high a proportion of the desired gamma isomer as possible in order to make the mixture economical and practical from the point of view of use as an insecticide. It is highly important also that the mixture containing the gamma isomer of the 1,2,3,4,5,6-hexachlorocyclohexane does not contain any substantial amount of any other material which is harmful to plants or any other material to which the insecticidal composition may be applied.

A number of different methods have been suggested in the past for the production of 1,2,3,4,5,6-hexachlorocyclohexane. All of these processes, however, possess certain disadvantages and particularly from the point of view of producing a material having suitable insecticidal properties. 1,2,3,4,5,6-hexachlorocyclohexane being a solid, the direct chlorination of benzene presents certain difficulties, primarily of a mechanical character. To overcome these difficulties it has been suggested that the chlorination be effected in a liquid medium. Chlorination of the benzene in the presence of water was accordingly tried but the yields obtained were low. An improvement was effected by adding a small amount of an alkali such as sodium hydroxide, to the mixture of benzene and water being chlorinated. The yields were increased somewhat but mechanical difficulties were still such that satisfactory yields were not obtainable.

I have now discovered an improved process whereby good yields of 1,2,3,4,5,6-hexachlorocyclohexane containing highly effective proportions of the gamma isomer may be obtained. The product of my new process may be used directly in insecticidal compositions with very satisfactory results without the necessity of concentrating or separating the gamma isomer. If desired, however, the latter may be separated from its isomers by differential solvent extraction.

As previously noted, benzene has been chlorinated by passing gaseous chlorine thru liquid benzene forming a layer over a dilute aqueous solution of sodium hydroxide. Shortly after chlorination begins, however, the density of the partially chlorinated layer of benzene increases and it sinks to the bottom of the chlorinating vessel with the result that the efficiency of the chlorinating operation drops markedly and may be entirely stopped by the plugging of the chlorine tube by the crystals of 1,2,3,4,5,6-hexachlorocyclohexane. I have now found that these difficulties may be obviated by incorporating in the aqueous alkaline solution a sufficient amount of soluble inert salt to make the aqueous solution of at least as high specific gravity as the chlorinated benzene. This may be conveniently accomplished by incorporating in the aqueous alkaline solution a soluble salt, such as, for example, sodium chloride. When using such a layer for the suspension of the benzene, as the chlorination proceeds and the density of the chlorinated benzene increases, a suspension of globules of chlorinated and partially chlorinated benzene in the aqueous solution results so that more efficient chlorination takes place. Suitable water soluble salts are those which do not react with the chlorinated benzenes and preferably not with chlorine, since the conversion of the salt to the chloride naturally requires increased amounts of chlorine for the operation. The amount of salt required depends, of course, on the particular salt used. With sodium chloride approximately 30% by weight, based on the weight of the aqueous alkaline mixture, gives quite satisfactory results.

The following examples will illustrate my preferred method of procedure.

*Example I*

A mixture of 600 grams of sodium chloride and 30 grams of sodium hydroxide was dissolved in two liters of water and placed in a glass flask, attached to a reflux condenser and provided with a means of introducing chlorine gas into the bottom of the solution. The flask was placed in a water bath maintained at a temperature of 20–25° C. during the operation. After solution of the sodium chloride and sodium hydroxide, 156 grams of benzene was placed on the top of the aqueous layer and chlorine introduced through the inlet tube referred to above at a rate of 0.67 mole per hour for a period of approximately 7 hours. At the end of this time a part of the oil layer had sunk to the bottom of the flask and a large amount of crystals had formed. The latter were recrystallized from chloroform and dried in vacuo. Yield, 181 grams of material shown by analysis to be 1,2,3,4,5,6-hexachlorocyclohexane.

*Example II*

One liter of an aqueous solution containing 22.2 g. sodium hydroxide and 278 g. sodium chloride was placed in a two liter flask of the type used in Example I above and 78 g. of benzene added. A total of 157 g. of gaseous chlorine was passed through the reaction mixture, maintained at a temperature of 23.5°–25° C. over a period of 145 minutes. After standing overnight the flask contained a white crystalline solid which was filtered, washed with water, and dried in air; weight, 101 grams. The filtrate containing oil heavier than water was distilled with 200 ml. of water and gave 18.12 of partly crystallized residue.

*Example III*

Fifty-five pounds of condensate water, 1.38 pounds of flake caustic soda and 17.1 pounds of sodium chloride were placed in a porcelain jar provided with a suitable cover containing an inlet for the passage of gaseous chlorine to the bottom of the reaction mixture. After agitating the mixture until all of the solids were in solution, 5.38 pounds of benzene was added and chlorine passed into the bottom of the reaction mixture, maintained at a temperature of 20–30° C., at the rate of 2 pounds per hour until 14.5 pounds had been used. The bulk of the water layer was then siphoned off and discarded and the remainder of the mixture was filtered. The crystals were washed on the filter with water and dried in a tunnel drier. A yield of 5.55 pounds of 1,2,3,4,5,6-hexachlorocyclohexane, corresponding to 27.6% on the benzene used, was obtained.

*Example IV*

One hundred fifty-seven g. of chlorine was passed into one liter of an aqueous solution containing 20.5 g. calcium hydroxide and 278 g. of sodium chloride overlaid with 78 g. of benzene, during a period of 5½ hours, the temperature being maintained at 20–25° C. and the operation being carried out as described in Example I above. The product was filtered after standing overnight and gave 91.8 g. of 1,2,3,4,5,6-hexachlorocyclohexane and 47.5 g. of an oil layer in the filtrate containing additional unrecovered hexachlorocyclohexane.

*Example V*

A reaction mixture consisting of 840 ml. of water, 560 g. of calcium chloride, 120 g. calcium hydroxide and 78 g. benzene was treated at a temperature of 23–28° C. with 176 g. of gaseous chlorine as described in Example I above. Fifty-three grams of dried crystalline 1,2,3,4,5,6-hexachlorocyclohexane was obtained.

It should be understood that my process is not limited to the exact operating conditions shown in the examples cited above. For example, the operation while preferably carried out at temperatures ranging from 15 to 30° C., may be effected at temperatures as high as 50° C. The proportions of water to benzene may likewise be varied over a considerable range, so long as a sufficient amount of water is used to maintain the salt and base used in solution and at the same time give a reaction mixture of sufficient fluidity to permit efficient chlorination and subsequent filtration. In place of the sodium chloride used in the examples I may use any other inert soluble salt, preferably an alkali or alkaline earth chloride. For the sodium hydroxide I may substitute other soluble bases such as potassium hydroxide, calcium hydroxide, strontium hydroxide, etc. The amount of base used may be varied considerably but generally 1 to 2% appears to be adequate. The amount of salts used may likewise be varied over a fairly wide range, but should be present in the reaction mixture in an amount at least sufficient to prevent the benzene layer from settling to the bottom of the reaction vessel after only partial chlorination.

As previously indicated, the method of chlorination used affects the character of products obtained. In this connection I have found that my process gives 1,2,3,4,5,6-hexachlorocyclohexane which is much more effective as an insecticide than 1,2,3,4,5,6-hexachlorocyclohexane produced by other methods. The table given below shows a comparison of the toxicity of a sample of my product made in accordance with the procedure described in Example I above, with two other samples of 1,2,3,4,5,6-hexachlorocyclohexane from different sources, using houseflies as the test insect. The supernatent fluids from 10 and 20 grams of each sample in 100 ml. Ultrasene were diluted at 5, 10, 2.5, and 5 per cent, respectively, in Ultrasene. The following table shows the data obtained:

*Table*

| Material | Equivalence of toxicant in diluted mixture | Per cent Dead in 24 hours | | | |
|---|---|---|---|---|---|
| | | 10 g./100 ml. | | 20 g./100 ml. | |
| | | 5% | 10% | 2.5% | 5% |
| Product of Example I | Per cent 0.5 / 1.0 | Per cent 98 | Per cent ---- / 97 | Per cent 95 | Per cent ---- / 99 |
| X Product | 0.5 / 1.0 | 11.7 | ---- / 51.5 | 3.0 | ---- / 28.1 |
| Y Product | 0.5 / 1.0 | 19.3 | ---- / 32.0 | 4.0 | ---- / 14.8 |

The 1,2,3,4,5,6-hexachlorocyclohexane made in accordance with my new and improved process can be used as prepared as an insecticide, or as an ingredient of insecticidal compositions with liquid carriers such as refined kerosene extracts, or in solvents such as carbon tetrachloride, benzene, methanol, ethyl ether, acetone, petroleum ether, nitroalkanes, etc. It is preferred to use small amounts of such concentrates with water, employing an emulsifier where necessary. It may also be satisfactorily employed in dust from incorporating, say 5%, of the 1,2,3,4,5,6-hexachlorocyclohexane with dusts such as "Pyrex ABB", "copper dust" (13.2% tribasic copper sulfate, 53% metallic copper), etc.

Insecticidal compositions of the above types containing 1, 2, 3, 4, 5, 6 - hexachlorocyclohexane prepared in accordance with my new and improved method have been found to be highly effective against such insects as Colorado potato beetle, potato flea beetle, spinach flea beetle, striped flea beetle, potato leafhopper, onion thrips, gladiolus thrips, lilac thrips, cabbage worm, cabbage looper, Japanese beetle, 3-lined potato beetle, elm leaf beetle larvae, striped cucumber beetle, squash bug, Leconte's sawfly larvae, lace bugs, chinch bugs, elm scale, striped caterpillar, spiny elm caterpillar, willow leaf beetle larvae, potato aphids, waxy cabbage aphids, various other aphids, houseflies, and other miscellaneous flies, honey bees, ants, mosquito larvae, roaches, fall webworm, grasshoppers, etc.

In addition to being highly toxic to the various types of insects enumerated above, and others, the 1,2,3,4,5,6 - hexachlorocyclohexane produced in accordance with my new method has the advantages of being free of excessive odor, and of being relatively non-toxic to animals and plants. For example, no ill effects were shown by a white mouse subjected to sixty applications of a kerosene spray containing 1% of the material and applied at double the usual quantity per thousand cubic feet. Similarly, no ill effects were caused by rubbing a 5% powder into the fur of a mouse on five occasions.

Now having described my invention, what I claim is:

1. In a process for preparing 1,2,3,4,5,6-hexachlorocyclohexane, the steps which comprise preparing a two liquid layer system consisting of an aqueous lower layer and an upper benzene layer, said lower layer containing a mixture of a soluble base and an inert water soluble salt in an amount sufficient to render the specific gravity of the said aqueous lower layer at least as high as that of the chlorinated benzene produced in the reaction, and passing a stream of chlorine into said lower layer to react at the interface with said benzene layer.

2. In a process for preparing 1,2,3,4,5,6-hexachlorocyclohexane, the steps which comprise preparing a two liquid layer system consisting of an aqueous lower layer and an upper benzene layer, said lower layer containing a mixture of a soluble base and a chloride selected from the group consisting of the alkali and alkaline earth chlorides said chlorides being present in an amount sufficient to render the specific gravity of the said aqueous lower layer at least as high as that of the chlorinated benzene produced in the reaction, and passing a stream of chlorine into said lower layer to react at the interface with said benzene layer.

3. In a process for preparing 1,2,3,4,5,6-hexachlorocyclohexane, the steps which comprise preparing a two liquid layer system consisting of an aqueous lower layer and an upper benzene layer, said lower layer containing a mixture of a soluble base selected from the class consisting of alkali hydroxides and alkaline earth hydroxides and a chloride selected from the group consisting of the alkali and alkaline earth chlorides said chlorides being present in an amount sufficient to render the specific gravity of the said aqueous lower layer at least as high as that of the chlorinated benzene produced in the reaction, and passing a stream of chlorine into said lower layer to react at the interface with said benzene layer.

4. In a process for preparing 1,2,3,4,5,6-hexachlorocyclohexane, the steps which comprise preparing a two liquid layer system consisting of an aqueous lower layer and an upper benzene layer, said lower layer containing a mixture of sodium hydroxide and sodium chloride said chloride being present in an amount sufficient to render the specific gravity of the said aqueous lower layer at least as high as that of the chlorinated benzene produced in the reaction, and passing a stream of chlorine into the said lower layer to react at the interface with said benzene layer.

GLEN H. MOREY.

REFERENCES CITED

The following references are of record in the file of this patent:

Van der Linden "Ber. der. Deut. Chem. Gesell.", vol. 45, page 232 (1912).